United States Patent
Li et al.

(10) Patent No.: US 11,948,087 B1
(45) Date of Patent: Apr. 2, 2024

(54) DROP IMPACT PREDICTION METHOD AND SYSTEM FOR HEAVY EQUIPMENT AIRDROP BASED ON NEURAL NETWORK

(71) Applicant: Huazhong University of Science and Technology, Wuhan (CN)

(72) Inventors: Renfu Li, Wuhan (CN); Zhaojun Xi, Wuhan (CN); Zhongda Wu, Wuhan (CN); Yichao Li, Wuhan (CN); Zhenlin Mei, Wuhan (CN)

(73) Assignee: Huazhong University of Science and Technology, Wuhan (CN)

(*) Notice: Subject to any disclaimer, the term of this patent is extended or adjusted under 35 U.S.C. 154(b) by 0 days.

(21) Appl. No.: 18/494,986

(22) Filed: Oct. 26, 2023

(30) Foreign Application Priority Data

Oct. 28, 2022 (CN) .......................... 202211335838.7

(51) Int. Cl.
*G06N 3/08* (2023.01)
*G06N 5/022* (2023.01)

(52) U.S. Cl.
CPC .............. *G06N 3/08* (2013.01); *G06N 5/022* (2013.01)

(58) Field of Classification Search
CPC .............. G06N 3/08; G06N 3/02; G06N 5/022
See application file for complete search history.

(56) References Cited

U.S. PATENT DOCUMENTS

2021/0312262 A1\* 10/2021 Postel ...................... G06N 3/08

FOREIGN PATENT DOCUMENTS

CN 111639397 A 9/2020

OTHER PUBLICATIONS

George, "A Hybrid Finite Element—Machine Learning Backward Training Approach to Analyze the Optimal Machining Conditions", Published: Nov. 8, 2021. (Year: 2021).\*
Wang, "Neural network-based simulation and prediction of precise airdrop trajectory planning", Available online Dec. 29, 2021. (Year: 2021).\*
Ouyang, "APER-DDQN: UAV Precise Airdrop Method Based on Deep Reinforcement Learning", date of publication May 10, 2022. (Year: 2022).\*
Hong, "Research on Cushion Characteristics of Self-inflating Buffering Airbag", Online: Jan. 16, 2014. (Year: 2014).\*

\* cited by examiner

*Primary Examiner* — Dave Misir

(74) *Attorney, Agent, or Firm* — Nitin Kaushik

(57) ABSTRACT

The present disclosure provides a drop impact prediction method and system for heavy equipment airdrop based on a neural network. The drop impact prediction method includes the following steps: S1: acquiring a plurality of sets of sample data by using a finite element model for drop simulation of heavy equipment airdrop; S2: determining structural parameters of a BP neural network, and preprocessing the structural parameters; S3: constructing a BP neural network model; and S4: predicting a drop impact situation of heavy equipment airdrop in an actual application process by using the trained BP neural network model.

5 Claims, 6 Drawing Sheets

Acquiring a plurality of sets of sample data, including a landing speed, a transverse wind speed, a position of the center of gravity, a height of the center of mass, an inclination of the ground, a type of the ground, stresses of airbags and a weight of a cargo, by using a finite element model for drop simulation of heavy equipment airdrop

Determining structural parameters of a BP neural network, taking the landing speed, the transverse wind speed, the position of the center of gravity, the height of the center of mass, the inclination of the ground, the type of the ground, the stresses of the airbags and the weight of the cargo as input parameters, taking situations whether heavy equipment roll over and whether the airbags are ruptured as output parameters, and pre-processing the structural parameters

Constructing a BP neural network model, and dividing the plurality of sets of pre-processed data into a training set and a verification set; training the BP neural network model by using the data in the training set and accumulated test data, and adjusting network parameters of the BP neural network model; and after the training is successful, testing the trained BP neural network model by using the data in the verification set to verify the accuracy of the neural network model

Predicting a drop impact situation of heavy equipment airdrop in an actual application process by using the trained BP neural network model, and determining whether the cargo rolls over and whether the airbags are ruptured after drop impact of heavy equipment airdrop

FIG. 1

DROP IMPACT PREDICTION METHOD AND SYSTEM FOR HEAVY EQUIPMENT AIRDROP BASED ON NEURAL NETWORK

CROSS-REFERENCE TO RELATED APPLICATIONS

The application claims priority to Chinese patent application No. 202211335838.7, filed on Oct. 28, 2022, the entire contents of which are incorporated herein by reference.

TECHNICAL FIELD

The present disclosure relates to the technical field of drop impact prediction, in particular to a drop impact prediction method and system for heavy equipment airdrop based on a neural network.

BACKGROUND

With the increasingly fierce military competition among countries and the rapid development of an aerospace technology, types, sizes and weights of airdropped materials are gradually increasing, and for such a trend, a more reliable buffer system is required. Cargoes and tanks belong to heavy airdrops, and they will suffer from a great reaction force from the ground when being parachuted to the ground. If the cargoes and the tanks are not protected, they will be damaged to cause great loss, and will further affect the progress and success of military combats. By airbag buffer, a touchdown speed of a load can be further reduced, so that an impact load is controlled within an allowable range, and at the same time, no rebound phenomenon occurs, so that the airdrops are protected.

At present, for practical problems of high test expense, long cycle and high risk of heavy equipment airdrop, a simulative calculation method has been adopted in most of domestic research. For example, the Chinese patent CN201410420956.7 discloses a simulation and evaluation method for airdrop landing in a complex environment. For the airdrop drop of cargoes with different masses, center-of-gravity positions, and falling speeds, if a simulation method is adopted for prediction, it takes a lot of time to construct different models, at the same time, the simulative calculation also takes time, and therefore, it is still more troublesome to directly predict, by simulation, whether the heavy equipment airdrop is successful.

SUMMARY

A problem to be solved by the present disclosure is that: an existing method for directly predicting heavy equipment airdrop by stimulation is more troublesome.

In order to solve the above-mentioned problem, on one hand, the present disclosure provides a drop impact prediction method for heavy equipment airdrop based on a neural network, including the following steps:

S1: acquiring a plurality of sets of sample data, including a landing speed, a transverse wind speed, a position of the center of gravity, a height of the center of mass, an inclination of the ground, a type of the ground, stresses of airbags and a weight of a cargo, by using a finite element model for drop simulation of heavy equipment airdrop;

S2: determining structural parameters of a BP neural network, taking the landing speed, the transverse wind speed, the position of the center of gravity, the height of the center of mass, the inclination of the ground, the type of the ground, the stresses of the airbags and the weight of the cargo as input parameters, taking situations whether heavy equipment roll over and whether the airbags are ruptured as output parameters, and pre-processing the structural parameters;

S3: constructing a BP neural network model, and dividing the plurality of sets of pre-processed data into a training set and a verification set; training the BP neural network model by using the data in the training set and accumulated test data, and adjusting network parameters of the BP neural network model: and after the training is successful, testing the trained BP neural network model by using the data in the verification set to verify the accuracy of the neural network model; and S4: predicting a drop impact situation of heavy equipment airdrop in an actual application process by using the trained BP neural network model, and determining whether the cargo rolls over and whether the airbags are ruptured after drop impact of heavy equipment airdrop.

Preferably, in step S1, the finite element model for drop simulation of heavy equipment airdrop includes:

a cargo, a cargo platform, and a plurality of airbags;

the lower surface of the cargo is in rigid connection with the upper surface of the cargo platform; and the plurality of airbags are cylindrical, and have upper surfaces being bonded with the lower surface of the cargo platform, and six exhaust ports are uniformly distributed in the circumferential direction of each of the cylindrical airbags.

Preferably, in step S2, pre-processing is normalizing.

Preferably, in step S3, the BP neural network model includes a three-layer structure:

an input layer, an intermediate hidden layer, and an output layer, respectively;

wherein the number of nodes on the input layer is 8, the number of nodes on the intermediate hidden layer is 12, and the number of nodes on the output layer is 2; and an S-type tangent function tansig is an activation function of neurons on the intermediate hidden layer, and an S-type logarithmic function logsig is an activation function of neurons on the output layer;

Preferably, in step S3, each of the plurality of sets of pre-processed data includes ten data in total, i.e., eight input data and two output data, and a hold-out method is adopted to divide the training set and the verification set in a ratio of 9:1.

Preferably, in step S3, said training the BP neural network model by using the data in the training set and accumulated test data, and adjusting network parameters of the BP neural network model includes:

training a network by using a neural network toolbox in MATLAB:

setting the model to be a neural network which is of a three-layer structure;

setting the number of the nodes on the input layer to be 8, the number of the nodes on the intermediate hidden layer to be 12, and the number of the nodes on the output layer to be 2;

setting the activation functions of the intermediate hidden layer and the output layer to be a tansig function and a logsig function, respectively;

setting a network training function to be traingdx and a network performance function to be mse;

setting network parameters, network iteration epochs, an expected error goal, and a learning rate lr; and after the parameters are set, substituting the data of the training set to start to train the neural network.

On the other hand, the present disclosure further provides a system adopting the above-mentioned drop impact prediction method for heavy equipment airdrop based on a neural network, wherein the system includes:

a data acquisition module configured to acquire a plurality of sets of sample data, including a landing speed, a transverse wind speed, a position of the center of gravity, a height of the center of mass, an inclination of the ground, a type of the ground, stresses of airbags and a weight of a cargo, by using a finite element model for drop simulation of heavy equipment airdrop;

a pre-processing module configured to determine structural parameters of a BP neural network, take the landing speed, the transverse wind speed, the position of the center of gravity, the height of the center of mass, the inclination of the ground, the type of the ground, the stresses of the airbags and the weight of the cargo as input parameters, take situations whether heavy equipment roll over and whether the airbags are ruptured as output parameters, and pre-process the structural parameters;

a neural network model construction module configured to construct a BP neural network model, and divide the plurality of sets of pre-processed data into a training set and a verification set; train the BP neural network model by using the data in the training set and accumulated test data, and adjust network parameters of the BP neural network model: and after the training is successful, test the trained BP neural network model by using the data in the verification set to verify the accuracy of the neural network model; and a prediction module configured to predict a drop impact situation of heavy equipment airdrop in an actual application process by using the trained BP neural network model, and determine whether the cargo rolls over and whether the airbags are ruptured after drop impact of heavy equipment airdrop.

Compared with the prior art, the drop impact prediction method and system for heavy equipment airdrop based on the neural network in the present disclosure have the following beneficial effects:

(1) according to the drop impact prediction method and system for heavy equipment airdrop based on the neural network in the present disclosure, the drop impact prediction method for heavy equipment airdrop based on the neural network is constructed, in the early stage, the sample data is acquired by using the finite element model for drop simulation of heavy equipment airdrop, and in the later stage, the neural network is trained by means of massive accumulated test data, so that it is predicted whether different cargoes roll over and whether the airbags are ruptured after drop impact; and compared with a prediction method in which a simulation model is directly used, the method is used to save a lot of calculation time, also improve the reliability and precision of drop impact prediction for heavy equipment airdrop, and provides scientific guidance for various equipment airdrop in an army;

(2) according to the drop impact prediction method and system for heavy equipment airdrop based on the neural network in the present disclosure, massive sample data is acquired by finite element simulation and accumulated test, and the data is normalized to obtain a training sample of the neural network, then, the neural network is constructed, learning and training are constantly performed by means of a Matlab neural network training toolbox, and thus, the prediction accuracy will become higher and higher; and (3) according to the drop impact prediction method and system for heavy equipment airdrop based on the neural network in the present disclosure, by constructing a cargo model and an airbag model, simulative calculation is performed on a landing buffer process under a normal condition and a limited condition of airdrop to obtain attitude change situations of cargoes in free fall, airbag buffer and airbag rebound stages in a cargo landing process. In addition, the accuracy of the simulation model is verified by comparison with the test data.

BRIEF DESCRIPTION OF DRAWINGS

FIG. 1 is a flow diagram of a drop impact prediction method for heavy equipment airdrop based on a neural network in the present disclosure;

DETAILED DESCRIPTION OF THE EMBODIMENTS

Figure 2:
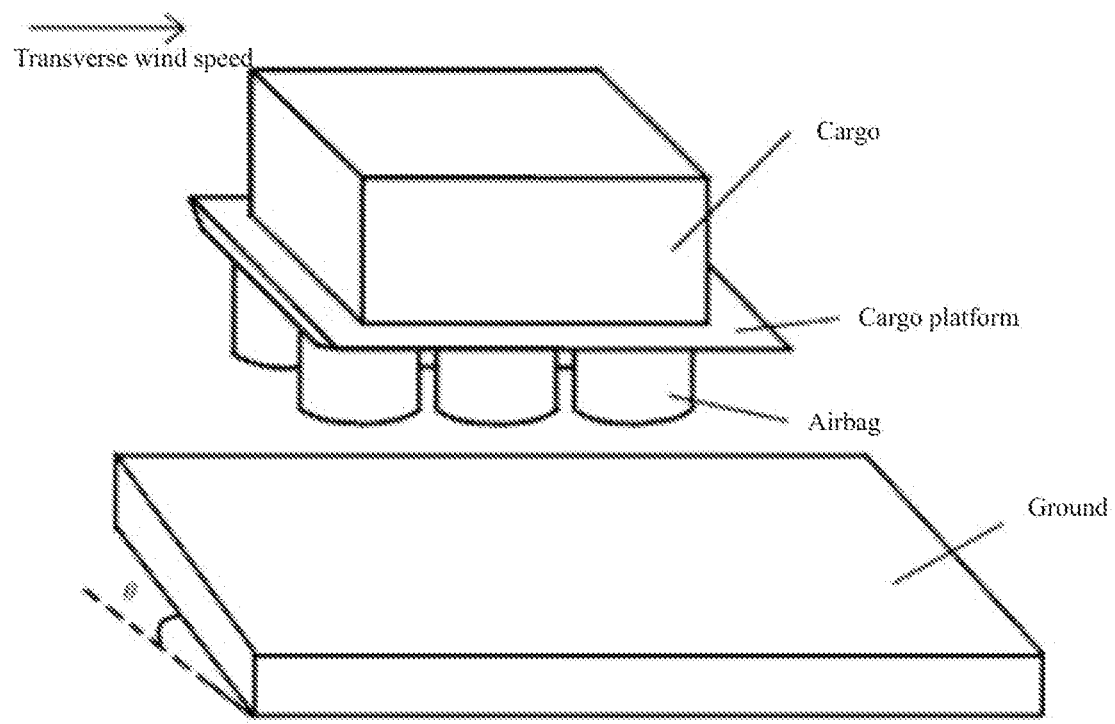
FIG. 2 is a schematic diagram of a finite element model for drop simulation of heavy equipment airdrop in the present disclosure.

In order to make the above-mentioned objectives, features and advantages of the present disclosure more obvious and comprehensible, specific embodiments of the present disclosure will be described in detail below in conjunction with the accompanying drawings.

Embodiment 1

Provided is a drop impact prediction method for heavy equipment airdrop based on a neural network, as shown in FIG. 1, the method includes the following steps:

S1: a plurality of sets of sample data, including a landing speed, a transverse wind speed, a position of the center of gravity, a height of the center of mass, an inclination of the ground, a type of the ground, stresses of airbags and a weight of a cargo, are acquired by using a finite element model for drop simulation of heavy equipment airdrop;

S2: structural parameters of a BP neural network are determined, the landing speed, the transverse wind speed, the position of the center of gravity, the height of the center of mass, the inclination of the ground, the type of the ground, the stresses of the airbags and the weight of the cargo are taken as input parameters, situations whether heavy equipment roll over and whether the airbags are ruptured are taken as output parameters, and the structural parameters are pre-processed:

S3: a BP neural network model is constructed, and the plurality of sets of pre-processed data are divided into a training set and a verification set; the BP neural network model is trained by using the data in the training set and accumulated test data, and network parameters of the BP neural network model are adjusted; and after the training is successful, the trained BP neural network model is tested by using the data in the verification set to verify the accuracy of the neural network model; and S4: a drop impact situation of heavy equipment airdrop in an actual application process is predicted by using the trained BP neural network model, and it is determined whether the cargo rolls over and whether the airbags are ruptured after drop impact of heavy equipment airdrop.

The drop impact prediction method for heavy equipment airdrop based on the neural network is constructed, in the early stage, the sample data is acquired by using the finite element model for drop simulation of heavy equipment airdrop, and in the later stage, the neural network is trained by means of massive accumulated test data, so that it is predicted whether different cargoes roll over and whether the airbags are ruptured after drop impact; and compared with a prediction method in which a simulation model is directly used, the method is used to save a lot of calculation time, also improve the reliability and precision of drop impact prediction for heavy equipment airdrop, and provides scientific guidance for various equipment airdrop in an army;

The neural network model for drop impact of heavy equipment airdrop is continuously trained by a neural network algorithm according to simulation data easily obtained in the early stage and the test data continuously accumulated in the later stage, and with the increase of iterative learning, the prediction precision of the model will be higher and higher. That is, the model is a recurrently-iterative and continuously-trained neural network prediction model that can be updated in real time. The time cost of a heavy equipment airdrop test is higher, it is impossible to obtain enough data to train the model in the early stage, and therefore, model data is mainly acquired by simulation in the early stage. The accuracy of the simulation model can be verified only by means of a small amount of test data, which indicates that the data can be acquired by simulation to perform early neural network training. In the later stage, with the increase of the number of tests, the collected data can be substituted into the former simulatively-trained model to be retrained, automatic training is performed every time when a certain amount of test data is increased, and repeated iterative training is performed in such a way, and finally, the accuracy of a measured result will be higher and higher.

As shown in FIG. 2, in step S1, the finite element model for drop simulation of heavy equipment airdrop includes:

a cargo, a cargo platform, and a plurality of airbags;

the lower surface of the cargo is in rigid connection with the upper surface of the cargo platform; and the plurality of airbags are cylindrical, and have upper surfaces being bonded with the lower surface of the cargo platform, and six exhaust ports are uniformly distributed in the circumferential direction of each of the cylindrical airbags.

In view of the characteristic of an airdrop drop process and the main purpose of simulation in the present embodiment, in order to lower simulation difficulty and shorten the calculation time, airdrop drop simulation is simplified as follows:

(1) the cargo and the cargo platform are regarded as an integer, a practical model is replaced with a cuboid, and there is no consideration on mooring;

(2) the cargo platform and the cargo drop at a certain speed (such as 10 m/s), and relevant parameters may be set; and (3) the cargo and the cargo platform keep dropping horizontally during drop.

FIG. 2 is a schematic diagram of a finite element model for drop simulation of heavy equipment airdrop. The mass and center of gravity of the cargo can be changed by setting a PointMass in ANSYS/LS-DYNA software, the mass of the cargo platform is achieved by changing the density of a material, and the cargo is in rigid connection with the cargo platform. Upper layers of the six cylindrical airbags are bonded to upper and lower backing plates respectively corresponding thereto, and the six exhaust ports are uniformly distributed in the circumferential direction of each of the cylindrical airbags. The ground is located under an airdrop platform, $\theta$ represents an included angle formed by the ground and a horizontal plane, and the type of the ground is changed by changing the material attribute of the ground. The transverse wind speed is horizontally rightward and may be set.

Figure 3:
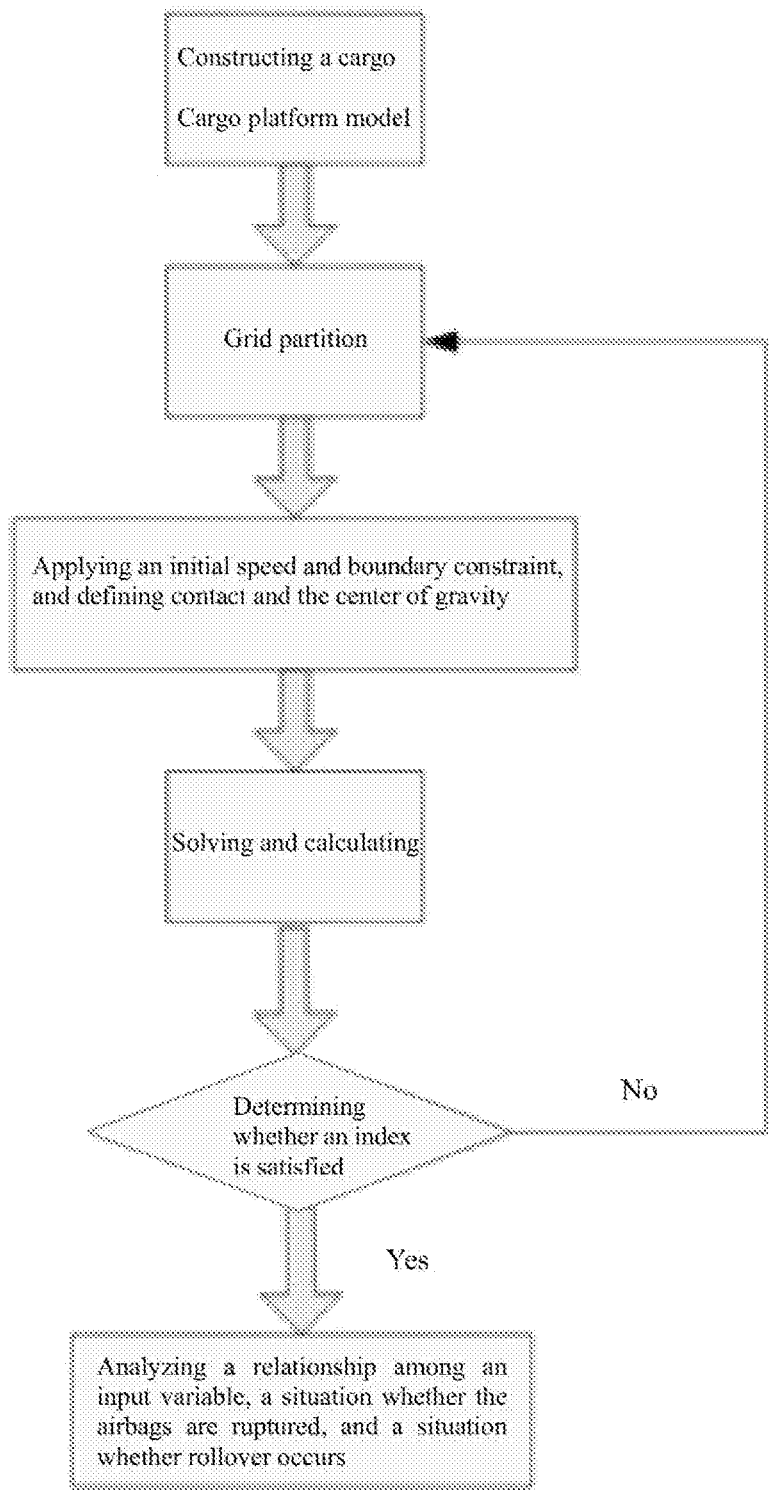
FIG. 3 is a flow diagram of finite element analysis for airdrop drop in the present disclosure.

A numerical simulation model for a key process in an airdrop system is constructed on a development platform for the ANSYS/LS-DYNA software by using a finite element method, and computer numerical simulation is performed, and finite element analysis for airdrop drop is shown in FIG. 3.

By constructing a cargo model and an airbag model, simulative calculation is performed on a landing buffer process of airdrop under a normal condition and a limited condition of airdrop to obtain attitude change situations of cargoes in free fall, airbag buffer and airbag rebound stages in a cargo landing process. In addition, the accuracy of the simulation model is verified by comparison with the test data, and massive sample data is acquired by finite element simulation.

In step S2, pre-processing is normalizing.

On the basis of simulative calculation, the input and output of the drop impact prediction method for heavy equipment airdrop are detailed, and the eight parameters including the landing speed, the transverse wind speed, the position of the center of gravity, the height of the center of mass, the inclination of the ground, the type of the ground, the stresses of the airbags and the weight of the cargo are introduced as system inputs, predicted numerical values of two factors whether the cargo rolls over and whether the airbags are ruptured are introduced as system outputs, and thus, drop buffer and airdrop situations of heavy equipment airdrop are further predicted precisely. The present system has the following characteristics: multi-input (eight inputs) and multi-output (two outputs); nonlinearity; no dominant expression relationship between each of the inputs and each of the outputs; and coupling.

For the above-mentioned system characteristics, the neural network is selected to construct a model, and since the structure of the neural network is based on a biological neural system, the neural network has the following characteristics:

nonlinearity: a process that information is processed in the brain is a nonlinear process. In a process that information is processed by the neural network, nodes on neurons in the brain are simulated in two different states of activation or inhibition, and such a process is expressed as a nonlinear relationship on a mathematical model;

non-limitation: one neural network is generally formed by connecting a plurality of neurons which affect each other, and the overall performance of a system not only depends on the states of the neurons, but also is affected by weighted connection among the neurons;

non-constancy: the neural network has self-learning ability, and in the process that the information is processed by the neural network, not only can various changes of the information occur, but also the neural network can also change with the information; and non-convexity: the non-convexity means that an energy function of the system has a plurality of extreme values, which is embodied in system outputs as that the system has a plurality of stable balanced states.

Above characteristics ensure that the neural network can well meet a requirement of system model construction. At the same time, the neural network also has the advantages of good approximation effect and simplicity in network construction, thereby facilitating modeling and lowering the difficulty in practical application deployment.

A learning process of the neural network consists of forward propagation and backward propagation. During forward propagation, input information is processed layer by layer from an input layer to a hidden unit layer and is transmitted to an output layer, and the states of the neurons on each layer only affect the states of the neurons on the next layer. If no expected outputs can be obtained on the output layer, the forward propagation is converted into the backward propagation, an error signal is returned along an original connection path, and the error signal is minimized by modifying weights of the neurons on each layer.

An arbitrary network with n nodes is set, and each node is characterized in a Sigmoid type. It is assumed that the network has only one output y, an output of any node i is Oi, and there are N samples (xi, yi) (k=1,2, . . . , N), for a certain input xk, the output of the network is yk, and the output of the node i is Oik.

The input of the node j is expressed as:

$$x_{jk} = \sum_i w_{ij} O_{ik} \tag{1}$$

the output of the node j is expressed as:

$$O_{jk} = f(x_{jk}) \tag{2}$$

wherein w is a connection weight among the nodes on each layer, and f is a transfer function.

A mean square error of the network is set as:

$$E = \frac{1}{2} \sum_{i=1}^{N} (y_k - \hat{y}_k)^2 \tag{3}$$

Definitions are shown as:

$$\delta_{jk} = \frac{\partial E_k}{\partial x_{jk}} \tag{4}$$

$$E = \frac{1}{2}(y_k - \hat{y}_k)^2 \tag{5}$$

wherein $\delta$ is an error gradient of a hidden layer, and $\hat{y}_k$ is a signal node value of the output layer.

If the neuron j is a neuron on the output layer, $$O_{jk} = \hat{y}_k \tag{6}$$

$$\delta_{jk} = \frac{\partial E_k}{\partial x_{jk}} = \frac{\partial E_k}{\partial \hat{y}_k} \frac{\partial \hat{y}_k}{\partial x_{jk}} = -(y_k - \hat{y}_k)f'(x_{jk}) \tag{7}$$

if the neuron j is a neuron on the hidden layer, $$\delta_{jk} = \frac{\partial E_k}{\partial x t_{jk}} = \frac{\partial E_k}{\partial O_{jk}} \frac{\partial O_{jk}}{\partial x_{jk}} = \frac{\partial E_k}{\partial O_{jk}} f'(x_{jk}) \tag{8}$$

$$\frac{\partial E_k}{\partial O_{jk}} = \tag{9}$$

$$\sum_n \frac{\partial E_k}{\partial x_{nk}} \frac{\partial x_{nk}}{\partial O_{jk}} = \sum_n \frac{\partial E_k}{\partial x_{nk}} \frac{\partial}{\partial O_{jk}} \sum_i w_{nj} O_{ik} = \sum_n \frac{\partial E_k}{\partial x_{nk}} w_{nj} = \sum_n \delta_{nk} w_{nj},$$

Therefore, for a BP neural network, an algorithm thereof specifically includes:

(1) an initial weight value is selected;

(2) for k=1 to N, by equations (6) to (9): from the forward perspective, Ojk, xjk and $\hat{y}_k$ are calculated, and from the reverse perspective, each reverse value is calculated;

(3) the weight value is amended as $$w_{ij} = w_{ij} - \mu \frac{\partial E}{\partial w_{ij}}, \mu > 0;$$

and (4) steps (2) and (3) are repeated until an output result is within an error range.

Normalization has the meanings of identity, uniformity and unity. No matter it is for modeling or calculation, it is necessary to achieve the unity of basic measurement units. The neural network is trained (probability calculation) and predicted according to respective statistical probabilities of samples in an event, and therefore, it is necessary to normalize the data of the samples. Moreover, for facilitating data processing, normalization can avoid some unnecessary numerical problems, accelerate convergence, avoid neuron saturation, and ensure that data with small numerical values in the data is not swallowed.

The prediction model has eight input nodes which are respectively the landing speed, the transverse wind speed, the position of the center of gravity, the height of the center of mass, the inclination of the ground, the type of the ground, the materials of the airbags and the weight of the cargo, after dimensions are unified, each input variable is normalized to a dimensionless floating-point type with a data range of 0 to 1.

Two numerical values "0" and "1" are output for the situations whether the cargo rolls over and whether the airbags are ruptured in the two output nodes on the prediction model, "0" is output for rollover and rupture, or else, "1" is output, and therefore, normalization is not needed.

After being processed, the two output variables and the eight input variables obtained by simulative calculation form one set of sample data, and the sample data formed by massive simulation data is inputted into the neural network for training and prediction.

Figure 4:
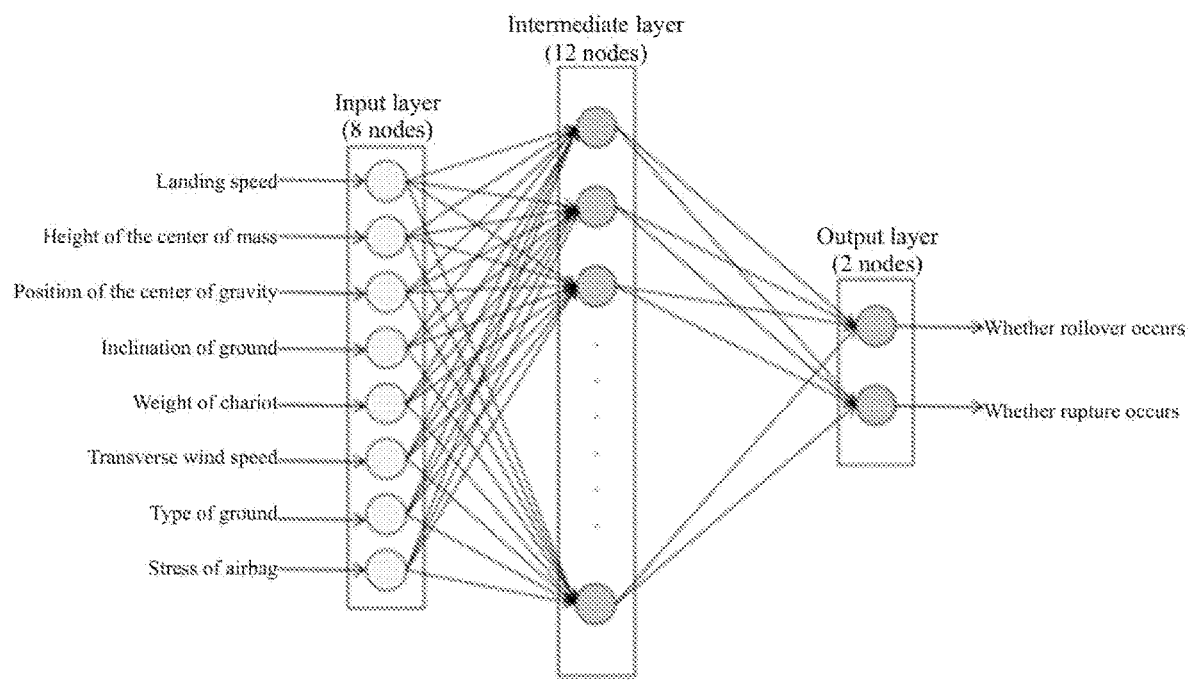
FIG. 4 is a schematic diagram of a drop impact prediction model for heavy equipment airdrop based on a neural network in the present disclosure.

As shown in FIG. 4, in step S3, the BP neural network model includes a three-layer structure:

an input layer, an intermediate hidden layer, and an output layer, respectively;

wherein the number of nodes on the input layer is 8, the number of nodes on the intermediate hidden layer is 12, and the number of nodes on the output layer is 2; and an S-type tangent function tansig is an activation function of neurons on the intermediate hidden layer, and an S-type logarithmic function logsig is an activation function of neurons on the output layer;

Based on the highly-nonlinear approximation ability of the neural network, the core thereof is to reversely propagate an error by adopting a negative gradient method and amend a network weight, the network is deeply trained by taking network output error minimization as an optimization goal until the error is approximate to a set error.

The prediction model for the neural network is constructed. The situations whether the heavy equipment airdrop is successful and whether the airbags are ruptured are predicted based on main impact factors for drop impact of heavy equipment airdrop to provide scientific guidance for various equipment airdrop in an army. When the prediction model for the neural network is constructed, the following three parameters including the number of network layers, the number of nodes on each layer (the input layer, the intermediate hidden layer, and the output layer) and the activation functions have to be determined in advance.

(1) The Number of the Network Layers

The network layer is mainly composed of the input layer, the intermediate hidden layer, and the output layer, and in view of input and output variables of the present prediction model, each of the input and output layers of the present model is a single layer.

The prediction precision of the network can be improved to a certain extent by increasing the number of the intermediate hidden layer, however, excessive intermediate hidden layers will prolong the calculation time of the neural network, and even cause an "overfitting" phenomenon. The present model has continuous functions and a closed definitional domain, it can be known from a Htcht-Nielsen research result that a single intermediate hidden layer can achieve any mapping from n dimensions to in dimensions, and therefore, the prediction model is achieved by selecting a three-layer BP neural network.

(2) The Number of Nodes on Each Layer

1) The Number of Nodes on the Input Layer

An input end of the neural network is used for receiving massive sample information, which is called as inputting variables, i.e., original input data. The more types the input information has, the more detailed feature information that can be reflected is, and the more actual situations the network model can represent. In a drop impact prediction system for heavy equipment airdrop, the sample data is acquired by a finite element simulation model, most of the data is closely related to drop impact of airdrop, the present model serves as a solution model formulti-variable polynomials, and inputs eight nodes which are respectively the landing speed, the transverse wind speed, the position of the center of gravity, the height of the center of mass, the inclination of the ground, the type of the ground, the stresses of the airbags and the weight of the cargo, 2) The Number of Nodes on the Intermediate Hidden Layer The intermediate hidden layer mainly plays a role in calculating data distributed by the input layer and transferring a calculated result to the output layer, i.e., constructing special mapping between an input variable and an output result, finding a certain complex relationship between the success or failure of heavy equipment airdrop and each of impact factors on a feature level finding impact degrees of the different impact factors, and characterizing the same with weights. A fluctuation error is further compensated by a threshold to be approximate to a real result. When the number of the nodes is selected, the following principles should be satisfied:

The number k of the nodes on the hidden layer is kept: $k<N-1$ (N represents the number of training samples), which is used for avoiding affecting a training result due to a "characteristic irrelevance" phenomenon between the network model and each of the training samples; and the number of the training samples is generally 2-10 times as large as the number of connection weights of the network model.

According to an empirical formula, the optimal node of the hidden layer is expressed as:

$$K=\sqrt{I+Q}+r, \ r\in[1,10] \quad (10)$$

in the equation (10): K is the number of neurons on the hidden layer; I is the number of neurons on the input layer; and Q is the number of neurons on the output layer. By comparing prediction precisions of networks with different hidden layer structures, the number of the optimal nodes on the hidden layer is 12.

3) The Number of Nodes on the Output Layer

Output nodes of the neural network depend on a requirement of a framework model. The present model is mainly used to output parameters whether a heavy airdropped cargo rolls over and whether airbags are ruptured, and is provided with two output neurons in total. By performing backward propagation and weight updating on the predicted numerical values whether the cargo rolls over and whether the airbags are ruptured, a forward estimation error of the model is further reduced, and the model is corrected.

(3) Activation Function

The neural network needs activation functions by which a single-layer perceptron is expanded to a plurality of neurons with activation functions, the expression ability of the neural network is improved, and a mapping relationship between each of input variable and each of output variables is more accurately expressed in more details, so that the predicted value is closer to a real value, and the precision of the neural network is improved.

The activation functions are selected for improving the expression ability of the neural network. The input variables in the present model are changed nonlinearly, and if it is expected to couple the input variables into the model to obtain a predicted result, an expression of a linear model is not enough, so nonlinear factors have to be added by the activation functions. Herein, an S-type tangent function tansig is selected as an activation function of neurons on the intermediate hidden layer, and an S-type logarithmic function logsig is selected as an activation function of neurons on the output layer.

In step S3, each of the plurality of sets of pre-processed data includes ten data in total, i.e., eight input data and two output data, and a hold-out method is adopted to divide the training set and the verification set in a ratio of 9:1.

Figure 5:
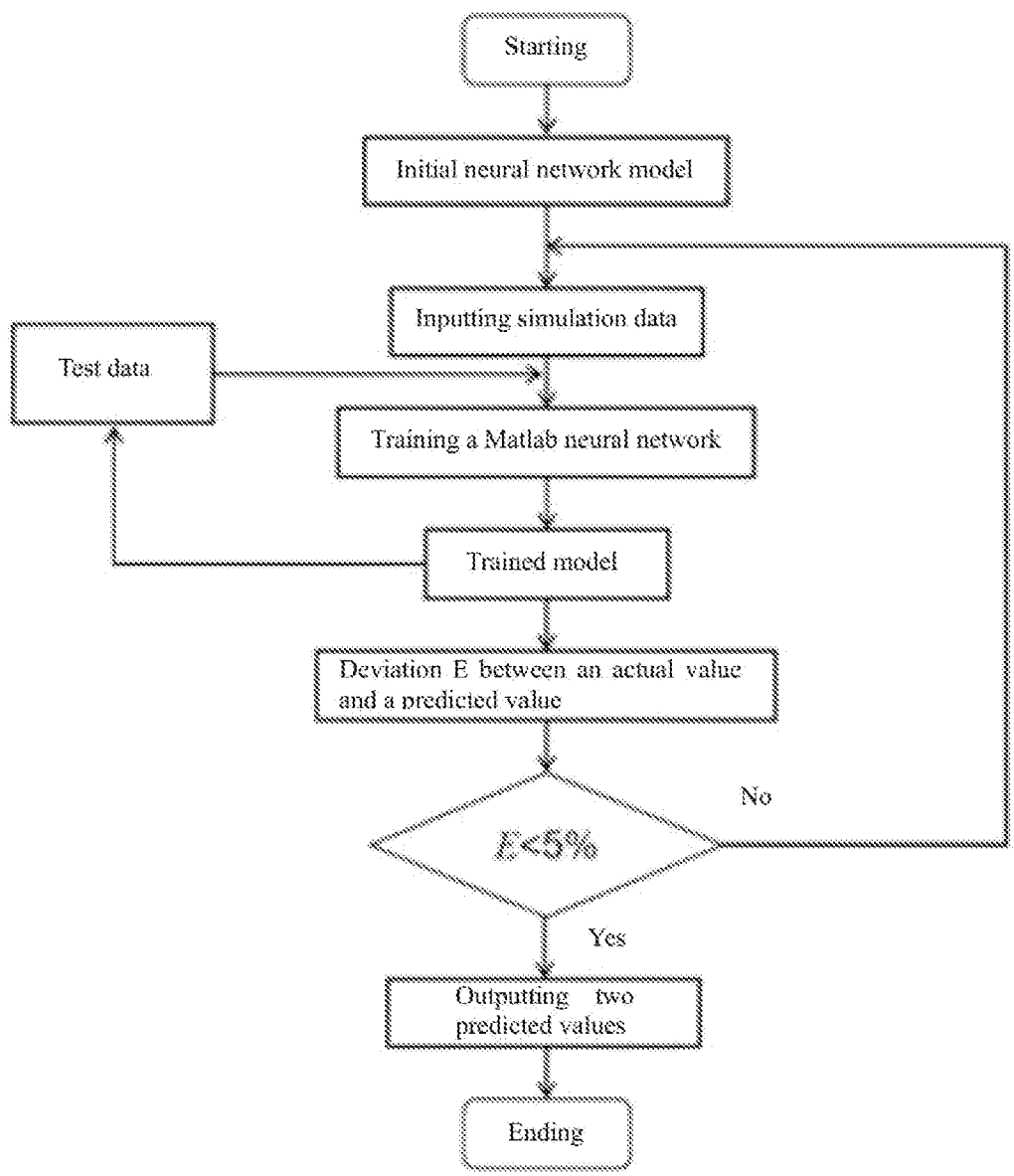
FIG. 5 is a flow diagram of neural network model training in the present disclosure.

As shown in FIG. 5, in step S3, said step that the BP neural network model is trained by using the data in the training set and accumulated test data, and network parameters of the BP neural network model are adjusted includes:

a network is trained by using a neural network toolbox in MATLAB:

the model is set to be a neural network which is of a three-layer structure;

the number of the nodes on the input layer is set to be 8, the number of the nodes on the intermediate hidden layer is set to be 12, and the number of the nodes on the output layer is set to be 2;

the activation functions of the intermediate hidden layer and the output layer are set to be a tansig function and a logsig function, respectively;

a network training function is set to be traingdx and a network performance function is set to be mse;

network parameters, network iteration epochs, an expected error goal and a learning rate lr are set; and after the parameters are set, the data of the training set is substituted to start to train the neural network.

After the model is trained, the data in the verification set is substituted to verify the accuracy of the neural network model. If the expected error for the verification of the drop impact prediction model for heavy equipment airdrop is within 5%, the neural network model can be well approximate to a real model, thereby achieving the work of outputting heavy equipment airdrop prediction.

In this way, according to the method in the present embodiment, massive sample data is acquired by finite element simulation, the data is normalized to obtain training samples of the neural network, then, the neural network is constructed, learning training is performed by using a Matlab neural network training toolbox, and the situations whether a cargo landed by heavy equipment airdrop rolls over and whether the airbags are ruptured are predicted.

Embodiment 2

Figure 6:
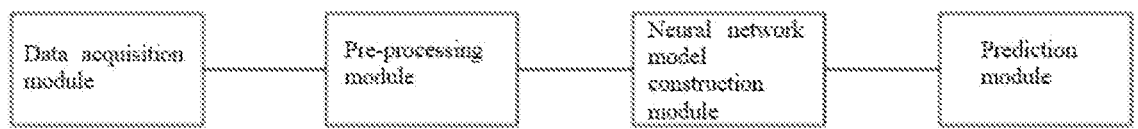
FIG. 6 is a schematic diagram of a drop impact prediction system for heavy equipment airdrop based on a neural network in the present disclosure.

Provided is a system adopting the drop impact prediction method for heavy equipment airdrop based on a neural network according to embodiment 1, as shown in FIG. 6, the system includes:

a data acquisition module configured to acquire a plurality of sets of sample data, including a landing speed, a transverse wind speed, a position of the center of gravity, a height of the center of mass, an inclination of the ground, a type of the ground, stresses of airbags and a weight of a cargo, by using a finite element model for drop simulation of heavy equipment airdrop;

a pre-processing module configured to determine structural parameters of a BP neural network, take the landing speed, the transverse wind speed, the position of the center of gravity, the height of the center of mass, the inclination of the ground, the type of the ground, the stresses of the airbags and the weight of the cargo as input parameters, take situations whether heavy equipment roll over and whether the airbags are ruptured as output parameters, and pre-process the structural parameters;

a neural network model construction module configured to construct a BP neural network model, and divide the plurality of sets of pre-processed data into a training set and a verification set; train the BP neural network model by using the data in the training set and accumulated test data, and adjust network parameters of the BP neural network model; and after the training is successful, test the trained BP neural network model by using the data in the verification set to verify the accuracy of the neural network model; and a prediction module configured to predict a drop impact situation of heavy equipment airdrop in an actual application process by using the trained BP neural network model, and determine whether the cargo rolls over and whether the airbags are ruptured after drop impact of heavy equipment airdrop.

In this way, according to the system in the present embodiment, massive sample data is acquired by finite element simulation, the data is normalized to obtain training samples of the neural network, then, the neural network is constructed, learning training is performed by using a Matlab neural network training toolbox, and the situations whether a cargo landed by heavy equipment airdrop rolls over and whether the airbags are ruptured are predicted.

It should be known that the parts which are not described in detail in the present description fall within the prior art.

Although the present disclosure has been disclosed as above, the protective scope of the present disclosure is not limited thereto. Various alterations and modifications can be made by those skilled in the art without departing from the spirit and scope of the present disclosure, and all of these alterations and modifications will fall within the protective scope of the present disclosure.

What is claimed is:

1. A drop impact prediction method for heavy equipment airdrop based on a neural network, comprising the following steps:

S1: acquiring a plurality of sets of sample data, comprising a landing speed, a transverse wind speed, a position of the center of gravity, a height of the center of mass, an inclination of the ground, a type of the ground, stresses of airbags and a weight of a cargo, by using a finite element model for drop simulation of the heavy equipment airdrop;

S2: determining structural parameters of a BP neural network, taking the landing speed, the transverse wind speed, the position of the center of gravity, the height of the center of mass, the inclination of the ground, the type of the ground, the stresses of the airbags and the weight of the cargo as input parameters, taking situations whether heavy equipment roll over and whether the airbags are ruptured as output parameters, and pre-processing the structural parameters;

S3: constructing a BP neural network model, and dividing the pre-processed structural parameters into a training set and a verification set; training the BP neural network model by using the data in the training set and accumulated test data, and adjusting network parameters of the BP neural network model; and after the training is successful, testing the trained BP neural network model by using the data in the verification set to verify the accuracy of the BP neural network model; and wherein said training the BP neural network model by using the data in the training set and accumulated test data, and adjusting network parameters of the BP neural network model specifically comprises:

acquiring the sample data by simulation to perform early neural network training, in a later stage, with increase of a number of tests, substituting collected data into a former simulatively-trained model to be retrained, and performing repeated iterative training;

in step S3, the BP neural network model comprises a three-layer structure:

an input layer, an intermediate hidden layer, and an output layer, respectively;

wherein the number of nodes on the input layer is 8, the number of nodes on the intermediate hidden layer is 12, and the number of nodes on the output layer is 2; and an S-type tangent function tansig is an activation function of neurons on the intermediate hidden layer, and an S-type logarithmic function logsig is an activation function of neurons on the output layer; and S4: predicting a drop impact situation of the heavy equipment airdrop in an actual application process by using the trained BP neural network model, and determining whether the cargo rolls over and whether the airbags are ruptured after drop impact of the heavy equipment airdrop.

2. The drop impact prediction method for heavy equipment airdrop based on a neural network according to claim 1, wherein in step S1, the finite element model for drop simulation of heavy equipment airdrop comprises:
  a cargo, a cargo platform, and a plurality of airbags;
  the lower surface of the cargo is in rigid connection with the upper surface of the cargo platform; and
  the plurality of airbags are cylindrical, and have upper surfaces being bonded with the lower surface of the cargo platform, and six exhaust ports are uniformly distributed in the circumferential direction of each of the cylindrical airbags.

3. The drop impact prediction method for heavy equipment airdrop based on a neural network according to claim 1, wherein in step S2, pre-processing is normalizing.

4. The drop impact prediction method for heavy equipment airdrop based on a neural network according to claim 1, wherein in step S3, each of the plurality of sets of pre-processed data comprises ten data in total, i.e., eight input data and two output data, and a hold-out method is adopted to divide the training set and the verification set in a ratio of 9:1.

5. The drop impact prediction method for heavy equipment airdrop based on a neural network according to claim 1, wherein in step S3, said training the BP neural network model by using the data in the training set and accumulated test data, and adjusting network parameters of the BP neural network model comprises:
  training a network by using a neural network toolbox in MATLAB:
  setting the model to be a neural network which is of a three-layer structure;
  setting the number of the nodes on the input layer to be 8, the number of the nodes on the intermediate hidden layer to be 12, and the number of the nodes on the output layer to be 2;
  setting the activation functions of the intermediate hidden layer and the output layer to be a tansig function and a logsig function, respectively;
  setting a network training function to be traingdx and a network performance function to be mse;
  setting network parameters, network iteration epochs, an expected error goal, and a learning rate lr; and
  after the parameters are set, substituting the data of the training set to start to train the neural network.

* * * * *